Patented Jan. 13, 1948

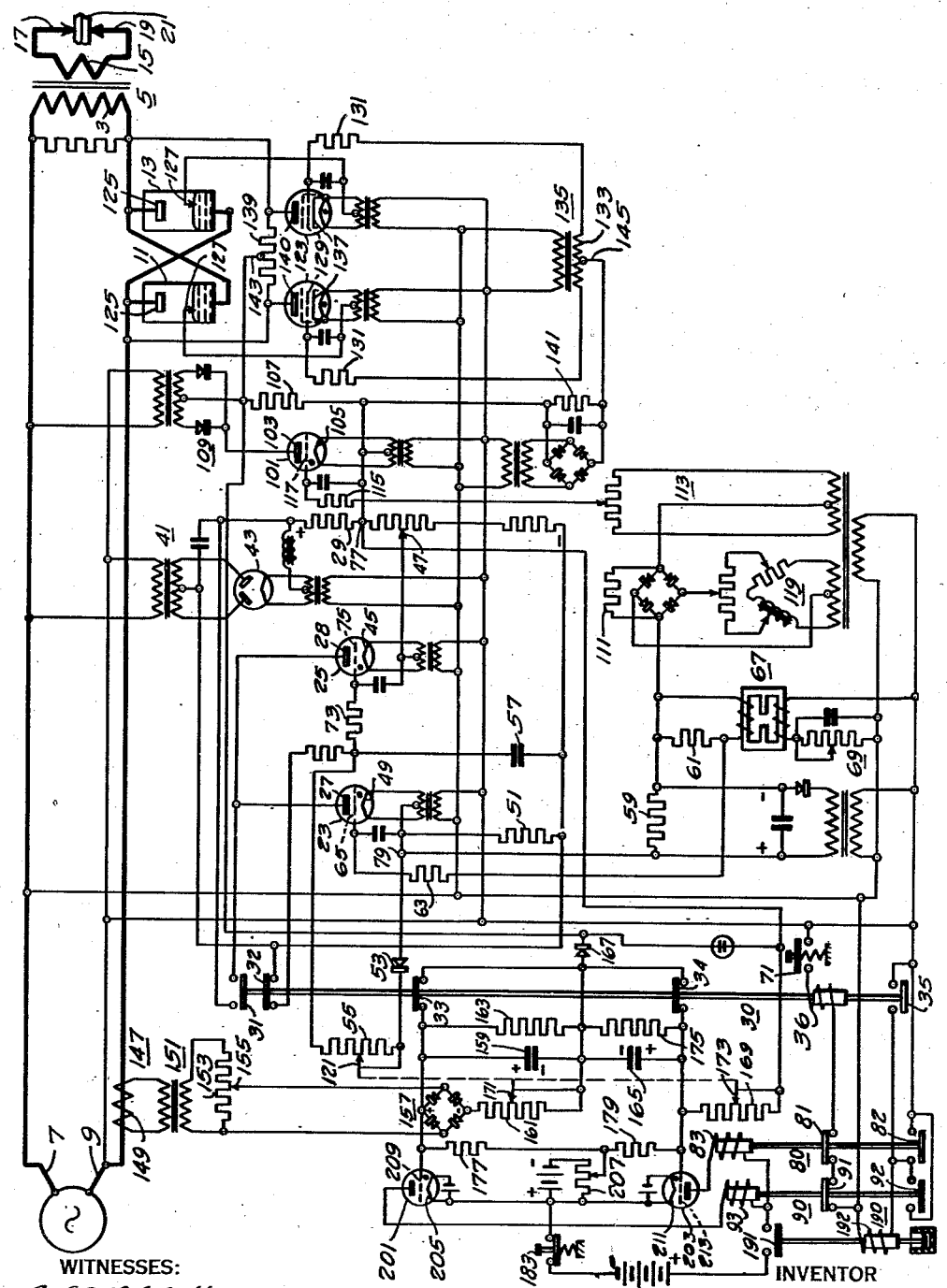

2,434,603

UNITED STATES PATENT OFFICE 2,434,603

ELECTRONIC CONTROL CIRCUIT

Edwin H. Vedder, Forest Hills, Pa., assignor to Westinghouse Electric Corporation, East Pittsburgh, Pa., a corporation of Pennsylvania Application February 24, 1945, Serial No. 579,535

8 Claims. (Cl. 250—27)

This invention relates to resistance welding control systems and has particular relation to a weld consistency indicator for use in such a system.

Several resistance spot welding applications wherein the dependability of the welds is quite important, require as much assurance as possible that each weld is of a good quality. Many factors enter into the quality of a weld, such as the mechanical condition of the welding machine, the condition of the welding electrodes, the condition of the surface of the material to be welded, the electrode pressure, the magnitude of the welding current, and the time of flow of the welding current.

The welding machine and the electrodes may be maintained in good condition by the operator. Also, present controls in the production of material affords a reasonably uniform surface on the material and apparatus is provided on many welding machines whereby the electrode pressure may be accurately controlled. However, even with these factors maintained substantially constant, variations in the welding current and/or the time of flow of the welding current may result in defective welds.

Variations in the current and the time of flow thereof may be caused by a number of things. Variations in the line voltage or in the load impedance may vary the current. When the current is controlled by a mechanical system, defective operation of a mechanical switch or other mechanical device may vary either the current or the time of flow of the current. When welding current is supplied through electric discharge tubes, variations in the time and/or amount of current may result from a partially defective tube. Other factors may also cause such variations. In any event, it is desirable to provide some kind of weld consistency indicator to check the quality of the weld as affected by the magnitude of the welding current and the time of flow thereof.

I am aware of a few consistency indicator circuits which have been used in the past. These prior indicators operated at the end of each weld, and before the next weld was started, to compare a standard constant voltage with a voltage proportional to the product of the welding current and the time of flow thereof during the previous weld. Such indicators, however, not only required special apparatus for coordinating the comparison operation with the welding operation but in addition added to the time required for each welding operation.

It is, accordingly, an object of my invention to provide an improved apparatus for indicating the consistency of each weld produced by a resistance welding system.

It is a further object of my invention to provide a novel and improved apparatus for checking the product of load current and the time of flow thereof in a system in which current is supplied to a load in timed periods.

In accordance with my invention, I propose to provide apparatus adapted to be coupled to the circuit through the primary of the welding transformer, for developing a first voltage which varies as the product of the load current and the time. A second standard voltage is also developed which is substantially equal in magnitude throughout the welding operation to the magnitude of the first voltage which would be developed by the supply of a load current of a desired value from the beginning of the welding operation. The second voltage attains an ultimate magnitude equal to the first voltage which would be developed by the supply of a load current of a desired value for a desired period of time. The first and second voltages are continuously compared. Means may be provided which are responsive to a predetermined difference in the first and second voltages to indicate the greater voltage and/or prevent further operation of the welding system.

The features of my invention which I consider novel are set forth with more particularity in the appended claims. The invention itself, however, with respect to the organization and operation thereof, together with additional objects and advantages, may best be understood from the following description of a specific embodiment when read in connection with the accompanying drawing, in which the single figure illustrates an electronic control system for resistance spot welding apparatus embodying my invention.

As shown in the drawing, the primary winding 3 of a welding transformer 5 is connected across a pair of alternating voltage supply lines 7 and 9 through a pair of inversely connected electric discharge valves of the arc-like type, 11 and 13, preferably ignitrons. The secondary winding 15 of the welding transformer is connected in circuit with a pair of welding electrodes 17 and 19 and the material 21 to be welded which is engaged therebetween.

The ignitrons 11 and 13 are controlled by an electronic control system of a type which has been manufactured for several years by the Westinghouse Electric & Manufacturing Company.

This control system includes a pair of electric valves, 23 and 25, preferably thyratrons, valve 23 being hereinafter designated the start tube and valve 25 being designated the stop tube. The anodes 27 and 28 of the start and stop tubes 23 and 25 are connected together and to the positive terminal of a direct-current voltage divider 29 through an originally open contact 31 of a relay 30. The divider 29 is energized from the supply lines 7 and 9 through an auxiliary transformer 41 and a full-wave rectifier 43.

The cathode 45 of the stop tube 25 is connected to an intermediate point 47 on the divider 29. The cathode 49 of the start tube 23 is connected to the negative terminal of the divider 29 through parallel circuits comprising a resistor 51 on one side and a rectifier 53, a timing potentiometer 55, and a timing capacitor 57 on the other side. The timing capacitor 57 is originally maintained in a discharged state by a discharge circuit completed thereacross through an originally closed contact 32 of the relay 30.

The control circuit of the start tube 23 extends from the cathode 49 through a resistor 59 across which a direct-current biasing voltage exists, a resistor 61 across which a voltage impulse is impressed at intervals, and a grid resistor 63 to the grid 65 of the tube. The voltage impulse across the resistor 61 is supplied through a peaking transformer 67 and a phase-shifting circuit 69 energized from the supply lines 7 and 9. The phase-shifting circuit 69 is adjusted so that a voltage impulse of a polarity and magnitude to render the start tube conductive occurs at an instant in a positive half-period of the alternating voltage corresponding to the instant at which the alternating current passes through zero in accordance with the power factor of the load.

Relay 30 may be energized by the operation of a push-button starting switch 71 which completes a circuit from one of the supply lines 9 through the push-button switch 71, the energizing coil 36 of the relay 30, an originally closed contact 81 of another relay 80, an originally closed contact 91 of still another relay 90 to the other supply line 7. When relay 30 is energized, the discharge circuit across the capacitor 57 is opened, and the anode circuits of the start and stop tubes 23 and 25 are closed. Consequently, the start tube 23 is rendered conductive in the next positive half-period of the alternating voltage by the voltage impulse supplied across the resistor 61.

The control circuit of the stop tube 25 extends from the cathode 45 through the intermediate tap 47 on the divider 29, the negative terminal of the divider 29, the capacitor 57, and a grid resistor 73 to the grid 75 of the tube. The voltage impressed in this circuit by the divider 29 tends to maintain the stop tube non-conductive. However, when the start tube 23 becomes conductive, the capacitor 57 is charged at a rate determined by the setting of the timing potentiometer 55. The voltage charge on the capacitor 57 opposes the biasing voltage supplied from the divider 29 in the control circuit of the stop tube. Consequently, a predetermined time interval after the start tube becomes conductive, the stop tube is rendered conductive.

It is then apparent that another intermediate point 7 on the divider is originally positive with respect to a point 79 at the cathode 49 of the start tube. When the start tube becomes conductive, the point 77 becomes negative with respect to point 79, but upon the stop tube becoming conductive, point 77 again becomes more positive than point 79. The voltage appearing between points 77 and 79 is employed as a biasing voltage in the control circuit of another tube 101, preferably a thyratron, which is designated as the heat control tube.

The anode 103 and cathode 105 of the heat control tube 101 are connected in circuit with another resistor 107 and an auxiliary source 109 of rectified alternating potential of the same phase as the voltage of supply lines 7 and 9. The control circuit of the heat control tube 101 extends from the cathode 105 through points 77 and 79, the resistor 59, another resistor 111, a balancing potentiometer circuit 113, and a grid resistor 115 to the grid 117 of the tube. As previously indicated, a biasing voltage is supplied across points 77 and 79 and another smaller biasing potential is supplied across the resistor 59. A voltage also exists across the other resistor 111, which takes the form of a rectified, alternating voltage which is inverted with respect to the grid 117 of the heat control tube and displaced in phase relative to the supply voltage of lines 7 and 9. The amount of phase displacement of this voltage is preselected by adjustment of the phase shifting circuit 119 through which it is supplied.

Before the start tube is rendered conductive, the biasing voltage between points 77 and 79 is sufficient to prevent the heat control tube from becoming conductive. When the start tube becomes conductive and while it remains conductive, the voltage existing between points 77 and 79 is such that the voltage peaks in the resultant grid-cathode voltage of the heat control tube, corresponding to the peaks in the voltage component supplied across resistor 111, rise above the critical grid-cathode voltage of the heat control tube to render it conductive. Therefore, the heat control tube becomes conductive in each half-period of the supply voltage throughout a period of time determined by the setting of the adjustable tap 121 on the timing potentiometer 55, and at an instant in such half period determined by the adjustment of the phase shifting circuit 119.

As will be explained hereinafter, the ignitrons 11 and 13 become conductive alternately and one of them becomes conductive each time the heat control tube becomes conductive and at an instant in a half-period determined by the instant at which the heat control tube 101 becomes conductive. Consequently, the phase shifting circuit 119 is adjusted to provide a desired magnitude of welding current and the timing potentiometer is set for the desired time of current flow.

If the starting characteristics of the two ignitrons 11 and 13 differ slightly, one may become conductive at an instant in a half-period that is slightly later than the instant at which the other ignitron becomes conductive in its corresponding half-period. Under such circumstances, the balancing potentiometer circuit 113 is adjusted to impress an alternating voltage in the control circuit of the heat control tube 101 of such a nature as to render the tube conductive at an instant slightly earlier in one-half period than in the other. In this way, compensation is provided for the difference in starting characteristics of the ignitrons. If the starting characteristics of the ignitrons are identical, the balancing potentiometer circuit is adjusted so that it has no effect on the control of the heat control tube.

A firing tube 123, preferably a thyratron, is provided for each of the ignitrons 11 and 13 and is connected between the anode 125 and the igniter 127 thereof. Then when a firing tube becomes conductive, current flows through the igniter of the corresponding ignitron to render that ignitron conductive.

The control grids 129 of the firing tubes 123 are connected together through their grid resistors 131 and the secondary winding 133 of an auxiliary transformer 135. The cathodes 137 of the firing tubes 123 are connected together through the igniters 127 of the ignitrons and a resistor 139 between the anodes 140 of the firing tubes. A control voltage consisting of a biasing voltage across a resistor 141 and the voltage across the resistor 107 in the anode circuit of the heat control tube 101 is impressed between a center tap 143 on the resistor 139 interconnecting the cathodes 137 of the firing tubes 123 and the center tap 145 of the secondary winding 133 interconnecting the grids 129 of the firing tubes.

Since the cathodes 137 are interconnected, an alternating-current voltage appears across the resistor 139. To balance out this alternating voltage, an equal alternating voltage displaced in phase by 180° is supplied across the secondary winding 133 of the auxiliary transformer 135. It follows that when the heat control tube 101 becomes conductive, the voltage across the resistor 107 in the anode circuit thereof causes the firing tube whose anode is positive at the time to become conductive and render the corresponding ignitron conductive. Thus, the ignitrons are rendered conductive to permit current to flow through the primary of the welding transformer of a value determined by the adjustment of the phase shifting circuit 119 for a period of time determined by the setting of the timing potentiometer 55. A welding operation is obtained by closing the push button switch 71 and holding it closed throughout the operation. Another welding operation may be obtained by releasing the push button switch and then reclosing it. Of course, successive operations may also be obtained by automatic operation of switch 71 or its equivalent by a suitable sequencing timing apparatus of which there are several on the market.

To check the consistency of the welds, a current transformer 147 is connected in the circuit through the primary winding 3 of the welding transformer 5. The second winding 149 of the current transformer 147 supplies the input to a step-up transformer 151, the output of which is supplied to a voltage divider 153. One terminal of the voltage divider 153 and an intermediate tap 155 thereon are connected to opposite input terminals of a full-wave rectifier 157. A capacitor 159 and an adjustable resistor 161 are connected in series across the output terminals of the full-wave rectifier 157. Thus, the capacitor 159 is charged while current flows through the primary winding 3 of the welding transformer, and the voltage charge on the capacitor 159 at any instant during the flow of such current is a measure of the product of the current and the time of flow thereof. A large resistor 163 is connected in parallel with the capacitor 159 and a discharge circuit across the capacitor is completed by the originally closed contact 33 of the relay 30.

Another capacitor 165 is connected in series with a rectifier 167 and an adjustable resistor 169 across the resistor 107 in the anode circuit of the heat control tube 101. As previously described, a voltage appears across this resistor 107 which is proportional to the welding current desired and which is provided for the timed period as measured by the timing potentiometer 55. Consequently, the voltage charge on the capacitor 165 at any instant during the timed period may be considered as a standard voltage proportional to the product of the desired current and the time elapsed since the start of the welding operation, the standard voltage reaching an ultimate value at the end of the timed period proportional to the product of the desired current and the desired time of flow thereof. By proper adjustment of the two resistors 161 and 169, the voltage charge on the two capacitors 159 and 165 throughout the welding operation may be equal so long as the desired current flows through the primary winding of the welding transformer and does not cease to flow before, nor continue to flow after, the expiration of the desired time period.

The adjustable taps 171 and 173 and 121 on the two resistors 161 and 169 and the timing potentiometer 55 are connected together in tandem so that the same ultimate voltage charge is reached on the capacitors 159 and 165 regardless of the length of the timed period. As a result, the capacitors 159 and 165 are charged over the same general range with each weld, which range is preferably limited to the relatively straight line portion of the changing curve.

Another large resistor 175 is also connected in parallel with the capacitor 165, and a discharge circuit is completed across that capacitor by an originally closed contact 34 of the relay 30.

The negative plates of the two capacitors 159 and 165 are connected directly together, and the positive plates are connected together through a pair of resistance elements 177 and 179. The voltage charges on the two capacitors 159 and 165 are thus continuously compared. Any difference in the voltage charge of one capacitor from the other results in a flow of current through the resistor elements 177 and 179 and the development of a voltage thereacross.

An auxiliary source 181 of direct-current voltage is provided which is connected through an originally closed push-button reset switch 183 and an originally open contact 191 of a relay 190 across two parallel circuits comprising the energizing coil 93 of relay 99 and an electric valve 201, such as a thyratron, in one circuit, and the energizing coil 83 of relay 89 and another electric valve 203, such as a thyratron, in the other circuit. The control circuit of one of these valves 201 extends from the cathode 205 through a direct-current biasing voltage source 207 and one of the resistance elements 177 interconnecting the positive plates of the capacitors 159 and 165, to the grid 209 of the valve. The control circuit of the other valve 203 extends from its cathode 211 through the source 207 of direct-current biasing voltage and the other resistance element 179 interconnecting the positive plates of the capacitors 159 and 165, to the grid 213 of the valve.

The magnitude of the biasing voltage impressed in each of these control circuits may be adjusted so that a predetermined difference in the voltage charges on the two capacitors 159 and 165 causes one or the other of the valves 201 and 203 to be rendered conductive. The particular valve which becomes conductive depends upon the polarity of the voltage across the resistance elements 177 and 179 and, consequently, upon which capacitor 159 or 165 has the greater voltage charge thereon. Thus, when the valve 201 becomes conductive, it is an indication that a predetermined difference in voltage charges exists between the two capacitors 159 and 165 and that the capacitor 159 has the greater charge. This would, in turn, indicate that the product of the actual current flowing and the time of flow thereof is greater than desired. Conversely, if the product of the actual current and the time of flow thereof is less than desired, the other valve 203 becomes conductive.

In performing a welding operation, the push-button starting switch 71 is first closed, energizing the relay 30. As a result, the discharge circuits of the capacitors 57, 159 and 165 are opened and the anode circuits of the start and stop tubes 23 and 25 are closed. The timed period of current flow is then initiated synchronously with respect to the supply voltage and current when the start tube 23 subsequently is rendered conductive. When relay 30 is energized, one of its contacts 35 also completes a circuit from the supply lines 7 and 9 through the energizing coil 192 of the relay 190.

During the timed period measured by the start tube-stop tube circuit, the ignitrons 11 and 13 are rendered conductive alternately in successive half-periods of the alternating voltage of the supply lines in the manner described. Should the product of the actual current flowing and the time of flow thereof differ from the desired standard, one or the other of the valves 201 or 203 is rendered conductive to energize either relay 80 or relay 90, as the case may be. If either of these relays is energized, the circuit through the energizing coil 36 of relay 30 is opened by contact 81 or 91, as the case may be, and the circuit through the energizing coil 192 of relay 190 is locked in through either contact 82 of relay 80 or contact 92 of relay 90.

When relay 30 is deenergized, the discharge circuits of the capacitors 57, 159 and 165 are completed and the anode circuits of the start and stop tubes are opened. Moreover, the start tube-stop tube circuit cannot be re-operated until the energized relay 80 or 90 is deenergized. Such deenergization may be accomplished by operation of the normally closed push-button reset switch 183.

It is apparent that the operation of the control system will be prevented in response to either a low or high actual current with correct actual time of flow, a low or high actual current with incorrect actual time of flow, or a correct actual current with incorrect time of flow.

Although I have shown and described a specific embodiment of my invention, I am aware that many modifications thereof are possible without departing from the spirit of the invention. I therefore, do not intend to limit my invention to the illustrated embodiment.

I claim as my invention:

1. A control system for use in supplying current through a load from an alternating voltage source through electric valve means, comprising control means for rendering said valve means effective to supply current through the load for a timed period including means for initiating said timed period, means adapted to be coupled to the circuit through said load for developing a first voltage which varies as the product of the load current and the time of flow thereof, means for developing a second standard voltage which is substantially equal in magnitude at any instant following operation of said initiating means to the magnitude of said first voltage which would be established at said instant by a load current of a desired value which flows for a desired period of time, and means for continuously comparing said first and second voltages.

2. A control system for use in supplying current through a load from an alternating voltage source through electric valve means, comprising control means for rendering said valve means effective to supply current through the load for a timed period including means for initiating said timed period, means adapted to be coupled to the circuit through said load for developing a first voltage which varies as the product of the load current and the time of flow thereof, means for developing a second standard voltage which is substantially equal in magnitude at any instant following operation of said initiating means to the magnitude of said first voltage which would be established at said instant by a load current of a desired value which flows for a desired period of time, and means for continuously comparing said first and second voltages including means responsive to a predetermined difference in said first and second voltages for preventing further operation of said control means.

3. A control system for use in supplying current through a load from an alternating voltage source through electric valve means, comprising control means for rendering said valve means effective to supply current through the load for a timed period including means for initiating said timed period, means adapted to be coupled to the circuit through said load for developing a first voltage which varies as the product of the load current and the time of flow thereof, means for developing a second standard voltage which is substantially equal in magnitude at any instant following operation of said initiating means to the magnitude of said first voltage which would be established at said instant by a load current of a desired value which flows for a desired period of time, and means for continuously comparing said first and second voltages including means responsive to a predetermined difference in said first and second voltages for indicating the greater voltage.

4. A control system for use in supplying current through a load from an alternating voltage source through electric valve means, comprising control means for rendering said valve means effective to supply current through the load for a timed period including means for initiating said timed period, means adapted to be coupled to the circuit through said load for establishing a first direct-current voltage proportional to the load current, means associated with said control means for establishing a second substantially constant direct-current voltage for a desired time period following operation of said initiating means, a pair of capacitors, first circuit means connecting the first capacitor to be charged by said first voltage whereby the voltage charge on the first capacitor is a measure of the product of the load current and the time of flow thereof, second circuit means connecting said second capacitor to be charged by said second voltage at a rate that the voltage charge on said second capacitor is equal at any time to the voltage charge on the first capacitor with a desired load current which flows for said desired time period, and means for continuously comparing the voltage charges on said first and second capacitors.

5. A control system for use in supplying current through a load from an alternating voltage source through electric valve means, comprising control means for rendering said valve means effective to supply current through the load for a timed period including means for initiating said timed period, means adapted to be coupled to the circuit through said load for establishing a first direct-current voltage proportional to the load current, means associated with said control means for establishing a second substantially constant direct-current voltage for a desired time period following operation of said initiating means, a pair of capacitors, first circuit means connecting the first capacitor to be charged by said first voltage whereby the voltage charge on the first capacitor is a measure of the product of the load current and the time of flow thereof, second circuit means connecting said second capacitor to be charged by said second voltage at a rate that the voltage charge on said second capacitor is equal at any time to the voltage charge on the first capacitor with a desired load current which flows for said desired time period, means for continuously comparing the voltage charges on said first and second capacitors, and means responsive to a predetermined difference in the voltage charges on said first and second capacitors for preventing further operation of said control means.

6. A control system for use in supplying current through a load from an alternating voltage source through electric valve means, comprising control means for rendering said valve means effective to supply current through the load for a timed period including means for initiating said timed period, means adapted to be coupled to the circuit through said load for establishing a first direct-current voltage proportional to the load current, means associated with said control means for establishing a second substantially constant direct-current voltage for a desired time period following operation of said initiating means, a pair of capacitors, first circuit means connecting the first capacitor to be charged by said first voltage whereby the voltage charge on the first capacitor is a measure of the product of the load current and the time of flow thereof, second circuit means connecting said second capacitor to be charged by said second voltage at a rate that the voltage charge on said second capacitor is equal at any time to the voltage charge on the first capacitor with a desired load current which flows for said desired time period, and means for continuously comparing the voltage charges on said first and second capacitors including means responsive to a predetermined difference in the voltage charges on said first and second capacitors for indicating the capacitor having the greater charge.

7. A control system for use in supplying current through a load from an alternating voltage source through electric valve means, comprising control means for rendering said valve means effective to supply current through the load for a timed period including means for initiating said timed period, means adapted to be coupled to the circuit through said load for establishing a first direct-current voltage proportional to the load current, means associated with said control means for establishing a second substantially constant direct-current voltage for a desired time period following operation of said initiating means, a pair of capacitors, first circuit means connecting the first capacitor to be charged by said first voltage whereby the voltage charge on the first capacitor is a measure of the product of the load current and the time of flow thereof, second circuit means connecting said second capacitor to be charged by said second voltage at a rate that the voltage charge on said second capacitor is equal at any time to the voltage charge on the first capacitor with a desired load current which flows for said desired time period, means connecting the negative terminals of said capacitors together and the positive terminals together and including a resistance element whereby the voltage across said resistance element is a measure of the difference in the voltage charges on said first and second capacitors, and work means responsive to the voltage across said resistance element.

8. A control system for use in supplying current through a load from an alternating voltage source through electric valve means, comprising control means for rendering said valve means effective to supply current through the load for a timed period including means for initiating said timed period, means adapted to be coupled to the circuit through said load for establishing a first direct-current voltage proportional to the load current, means associated with said control means for establishing a second substantially constant direct-current voltage for a desired time period following operation of said initiating means, a pair of capacitors, first circuit means connecting the first capacitor to be charged by said first voltage whereby the voltage charge on the first capacitor is a measure of the product of the load current and the time of flow thereof, second circuit means connecting said second capacitor to be charged by said second voltage at a rate that the voltage charge on said second capacitor is equal at any time to the voltage charge on the first capacitor with a desired load current which flows for said desired time period, means connecting the negative terminals of said capacitors together and the positive terminals together and including resistance means whereby the voltage across said resistance means is a measure of the difference in the voltage charges on said first and second capacitors, a pair of open work circuits, means responsive to a predetermined voltage of one polarity on said resistance means for completing one of said work circuits, and means responsive to a predetermined voltage of opposite polarity on said resistance means for completing the other work circuit.

EDWIN H. VEDDER.

REFERENCES CITED

The following references are of record in the file of this patent:

UNITED STATES PATENTS

| Number | Name | Date |
|---|---|---|
| 2,259,331 | Vedder | Oct. 14, 1941 |
| 2,295,297 | Schneider | Sept. 8, 1942 |
| 2,024,838 | Stansbury | Dec. 17, 1935 |
| 2,208,349 | Ulbricht | July 16, 1940 |
| 2,176,742 | La Pierre | Oct. 17, 1939 |
| 2,361,845 | Hutchins | Oct. 31, 1944 |
| 2,288,387 | Berry | June 30, 1942 |